Oct. 5, 1965    J. G. VAN SANTEN ETAL    3,210,549

VARIABLE-FEEDBACK ELECTRO-OPTICAL DEVICE

Filed Nov. 14, 1961    2 Sheets-Sheet 1

INVENTORS
JOHANNES G. VAN SANTEN &
GESINUS DIEMER
BY
AGENT

INVENTORS
JOHANNES G. VAN SANTEN
GE SINUS DIEMER
BY
AGENT

United States Patent Office 3,210,549
Patented Oct. 5, 1965

3,210,549
VARIABLE-FEEDBACK ELECTRO-OPTICAL
DEVICE
Johannes Gerrit van Santen and Gesinus Diemer, both of Emmasingel, Eindhoven, Netherlands, assignors to North American Philips Company, Inc., New York, N.Y., a corporation of Delaware
Filed Nov. 14, 1961, Ser. No. 152,326
Claims priority, application Netherlands, Nov. 22, 1960, 258,240
15 Claims. (Cl. 250—213)

This invention relates to variable-feedback electro-optical devices.

Devices are known comprising a circuit arrangement of an electrical supply source, a photo-conductive element and a radiation element of which the intensity of the radiation emitted is dependent on the electrical energy supplied to said element, in a manner such that a change of the impedance of the photo-conductive element affects the supply of electrical energy to the radiation element. In such electro-optical devices, optical feedback coupling may be used, in the sense that a smaller or larger part of the radiation emitted by the radiation element is received by the photo-conductive element and control or also control the impedance of this element. This feedback coupling may be a positive one, as a result of which the device reacts more strongly to an electrical or optical signal supplied to it. In case of a sufficiently strong positive feedback coupling, instability may occur, which phenomenon is used in trigger circuit arrangements to be realised with the said elements, which arrangements may be used in shift registers and other circuit arrangements for retaining information for a shorter or longer period. For example, a bistable relaxation circuit arrangement is known comprising two series arrangements connected to the same voltage source each having a photo-conductive element and an electro-luminescent element coupled optically therewith, all these elements being connected to the same neutral point of the circuit arrangement.

It is also known to compose a picture reproduction panel of photo-conductive and luminescent elements associated with each other, in particular electro-luminescent elements. In these so-called solid state image amplifiers, an additional amplification can be obtained by a restricted measure of optical feedback coupling between the photo-conductive and luminescent elements associated with each other. In the case of stronger positive feedback coupling, the image reproduced may be retained for a longer period as a result of instability, although in that case the half-tones are as a rule not reproduced.

The measure of feedback coupling, either positive or negative, in such electro-optical devices is determined by various factors collectively. In addition to the overlapping of the spectral sensitivity curve of the photo-conductive element and the spectral emission curve of the radiation element coupled optically therewith and to what part the radiation emitted by the radiation element is received by the photo-conductive element—which part, in addition to the arrangement of the elements with respect to each other, is also dependent on the permeability of the media contained between them—the frequency and the frequency spectrum and the amplitude respectively of the supply voltage play a part.

The desired extent of feedback coupling will be different in accordance with the purpose to which the device is to be put. Usually, the photo-conductive element and the radiation element, for which in most of the cases an electroluminescent element is used, are combined to a structural unit. Without special measures, the extent of optical feedback can then only be changed by varying the supply voltage. This has the drawback that the output signal can no longer be optimal. Under given circumstances, an output signal which is as large as possible will be obtained when the supply voltage is as high as possible, in which naturally the condition holds that the maximum voltage over an element connected in the circuit arrangement should not exceed the voltage maximally permitted for that element. For example, the maximum voltage over an element should remain below the breakdown voltage thereof.

The object of the invention is to provide an electro-optical device having a radiation element fed back to a photo-conductive element, the extent of feedback coupling being controllable in a simple manner without the maximally obtainable amplitude of the output signal being influenced as is the case in the above mentioned change of the supply voltage.

According to the invention, an electro-optical device comprises a star connection which is supplied by a main electrical supply source and which comprises at least three branches connected to the same neutral point, in which the first branch comprises a photo-conductive element, the second branch comprises a first radiation element with an intensity of the radiation emitted which is dependent on the electrical energy supplied to said element, which element is coupled optically with the photo-conductive element in the first branch, and the third branch comprises a second radiation element whereof the intensity of the emitted radiation is dependent on the electrical energy supplied to said element. In the second branch is included, in series with the first radiation element, a controllably adjustable impedance and/or an auxiliary electrical voltage source whereof, without influencing the voltage impressed upon the circuit arrangement by the main electrical supply source, the voltage can be adjusted in a controllable manner. It is noted that by a photo-conductive element is understood in this connection an element, the electrical impedance of which is altered by suitable electro-magnetic or corpuscular radiation impinging upon the element, for example by change of the resistance or the capacity, to return to its original value after suppressing this irradiation. The electro-magnetic radiation may be situated in the visible part of the spectrum, but radiation having a longer or shorter wavelength, for example infrared or X-ray radiation, may also be suitable. By radiation element with an intensity of the radiation emitted dependent upon the electrical energy supplied to said element is not only meant an electroluminescent, an electro-photoluminescent or a different type of element having a luminescent solid substance, but inter alia also a radiation element in which the radiation emitted is produced by a gas discharge or an electric heating of a solid substance, for example a filament. By controlling the impedance or the voltage of the voltage source which, according to the invention, is connected in series with the first radiation element, the extent of feedback coupling between this radiation element and the photo-conductive element in the first branch may be adjusted at will without the part of the voltage supplied by the main supply source appearing across the radiation element in the third branch needing alteration, this in contrast with the known control by means of changing the voltage of the main supply source.

In order that the invention may readily be carried into effect, it will now be described, by way of example, with reference to the accompanying drawings, in which FIGURE 1 shows the electric circuit diagram of a device in which the control of the optical feedback occurs by means of an adjustable impedance;

Figure 6:
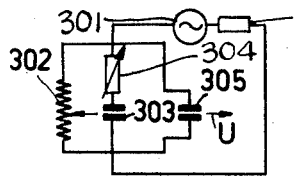
Figure 7:
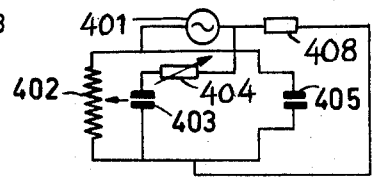

FIGURE 6 in diagrammatic form shows a different embodiment of the device according to the invention, and FIGURE 7 shows the circuit diagram of an embodiment which differs from that in FIGURE 6 in the connection of the branch with the first radiation element to the main supply source.

Figure 8:
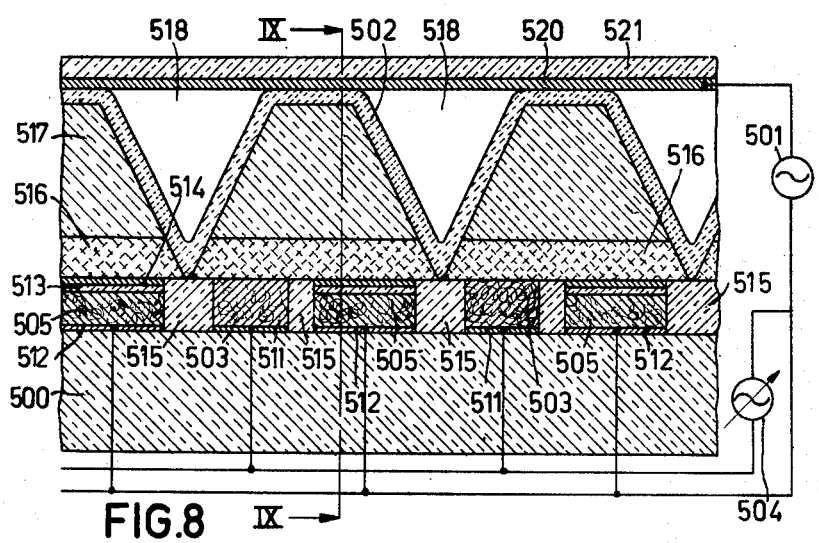
Figure 9:
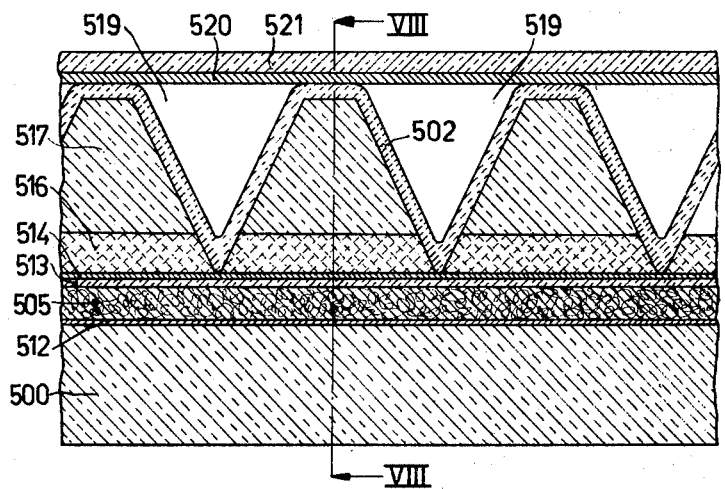

FIGURES 8 and 9 show a part of a cross sectional view of a solid-state-image amplifier with adjustable positive optical feedback.

Figure 1:
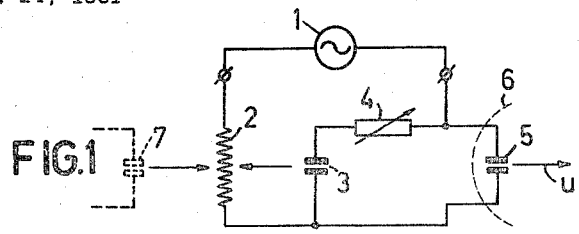

The device according to the circuit diagram of FIGURE 1 comprises three star-connected branches connected to an alternating voltage source 1. The first branch comprises a photo-conductive cell 2, for example a cadmium sulphide cell. The second branch comprises an electro-luminescent cell 3 with electrically in series therewith an impedance 4 of which the value is adjustable. The electro-luminescent cell 3 and the photo-conductive cell 2 are arranged with respect to each other so that radiation from the cell 3 may act upon the photo-conductive cell 2, which is indicated in the figure by an arrow between the two cells. The controllable impedance 4 may be formed by an adjustable resistor. However, also a different type of adjustable impedance, for example a variable inductance or capacitance or a combination of impedances, at least one of which is adjustable, may be used.

The third branch comprises an electro-luminescent cell 5, the radiation U of which forms the output signal of the device. By an optical screening indicated by 6 it is prevented that radiation from the cell 5 may act upon the photo-conductive cell 2 in the first branch. Viewed from the voltage source 1, the parallel combination of the branches with the electro-luminescent cells 3 and 5 is electrically connected in series with the branch comprising the photo-conductive cell 2. The operation of the device according to the circuit diagram shown in FIGURE 1 is as follows. Without irradiation of the photo-conductive cell 2, the resistance thereof is high so that substantially the whole voltage of the source 1 appears over it and the radiation elements 3 and 5 do not emit any, or emit very little, light. If the cell 2 is irradiatied by outside means, for example because an electrical signal is supplied to a further electro-luminescent cell 7 coupled optically only to this cell for this purpose, the voltage across the cell 2 decreases, while that across the electro-luminescent cells 3 and 5 increases. The increase of the voltage at the cell 3 will be smaller accordingly as the adjusted value of the impedance 4 is higher. Since the radiation of the electro-luminescent cell 3 reacts upon the photo-conductive cell 2 and supports the operation of the radiation produced by the outside cell 7, this is a case of positive feedback. The feedback ratio is dependent upon the value of the impedance 4, so that by adjustment of this impedance the feedback ratio can be controlled. The maximum output signal produced by the cell 5, which occurs when as a result of sufficiently intensive irradiation of the cell 2 the resistance thereof no longer is significant, is not influenced by the value of the impedance 4.

Very suitable for a practical construction is the construction of the impedance 4 controlling the feedback ratio as a photo-conductive element which has adjustable outside illumination means associated therewith.

Figure 2:
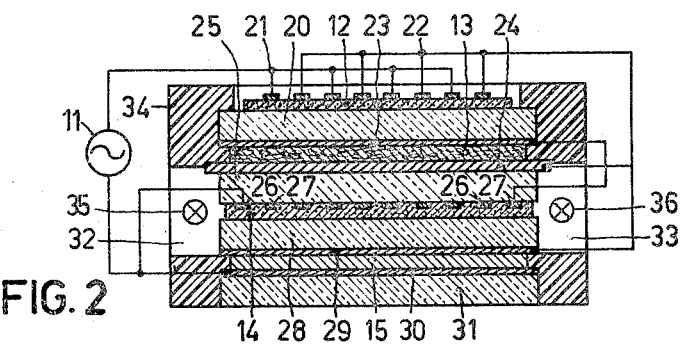
FIGURE 2 shows a cross sectional view of a device corresponding to the circuit diagram of FIGURE 1.

A possible construction of a device according to the circuit diagram of FIGURE 1 is shown in FIGURE 2 which shows a cross sectional view. The photo-conductive cell 2 of FIGURE 1 is in this case formed by a layer of photo-conductive material 12 provided on a transparent carrier 20 which consists, for example, of glass. On the layer 12, a well-known arrangement of interdigital, comb-shaped electrodes 21 and 22 is provided. The other side of the carrier 20 is provided with a transparent laminar electrode 23, preferably consisting of a layer of conductive tin oxide. An electro-luminescent layer 13 is provided on the electrode 23 which layer corresponds to the electro-luminescent cell 3 in FIGURE 1. The radiation of the layer 13 can influence the layer 12 through the electrode 23 and the carrier 20.

Opposite to the electrode 23, the layer 13 is provided with a second electrode 24, which preferably is not transparent. This electrode may consist, for example, of a comparatively thick vapour-deposited metal layer on the layer 13, for example consisting of aluminum. A second insulating carrier, for example formed by a glass plate 25, engages the electrode 24 and is provided, on the side remote therefrom, with two interlined comb-shaped electrodes 26 and 27 which preferably consist of a local transparent tin oxide film of the plate 25. On these electrodes 27 and 26 a photo-conductive layer 14 extends which forms the controllable impedance element corresponding to the element 4 of FIGURE 1. A further glass plate 28 engages this layer 14 which plate is provided on its other side with a conducitve laminar electrode 29. This electrode 29 is non-transparent and preferably consists of a reflecting metal layer, for example vapour-deposited aluminum of suitable thickness. The electrode 29 is in contact with a second electro-luminescent layer 15 which on its other side is in contact with a transparent laminar electrode 30 on the surface of a further transparent carrier 31. The electro-luminescent layer 15 corresponds to the electro-luminescent cell 5 in FIGURE 1.

With the exception of two channels 32 and 33 extending in the direction at right angles to the plane of the drawing at the height of the photo-conductive layer 14 and the reflecting electrodes 24 and 29 on either side thereof, the assembly is surrounded on the sides by a non-transparent insulating jacket 34 which may consist for example of a hardened epoxy casting resin. The electric connection of the assembly is identical to that of FIGURE 1. The electric supply source 11 is connected on the one side to the comb-shaped electrode 21 of the photo-conductive layer 12 and on the other side to the transparent electrode 30 of the layer 15 and to the comb-shaped electrode 26 of the layer 14. The other comb-shaped electrode 27 of this layer is connected in conductive manner to the upper transparent electrode 23 of the electro-luminescent layer 13. The second electrode of this layer, namely the reflecting metal layer 24, and also the reflecting electrode 29 of the electro-luminescent layer 15 are conductively connected to the second comb-shaped electrode 22 of the photo-conductive layer 12. The resistance of the photo-conductive layer 14 may be adjusted by means of incandescent lamps 35 and 36 provided in the channels 32 and 33, the light of which lamps laterally enters the glass plates 25 and 28 and impinges upon the layer 14 by the reflection of the electrodes 24 and 25. The radiation intensity of the incandescent lamps 35 and 36, which preferably are rod-shaped, may be controlled in known manner, for example by means of a usual adjustable resistor connected in series with them.

In connection with the heat development it may be of advantage not to perform the illumination of the photo-conductive layer 14 by incandescent lamps but by means of a further electro-luminescent layer, which is not shown in FIGURE 2. Said further electro-luminescent layer should in that case extend parallel to the layer 14 and be provided with laminar electrodes, which are adapted to be connected to an adjustable voltage, so that by control of this voltage the luminance of this further layer and thereby the resistance of the layer 14 is adjusted. This further electro-luminescent layer should be provided spatially between the electrodes 24 and 29.

For a satisfactory electrical contact between the layer 13 and the electrode 24 and also between the layer 15 and the electrode 29, these electrodes may each consist of two conductive layers which are in contact with one another, one on the carrier 25 and 28 respectively, the other on the electro-luminescent layers 13 and 15 respectively. The conductive layer on an electro-luminescent layer may be provided, for example, by vapour-deposition.

Figure 3:
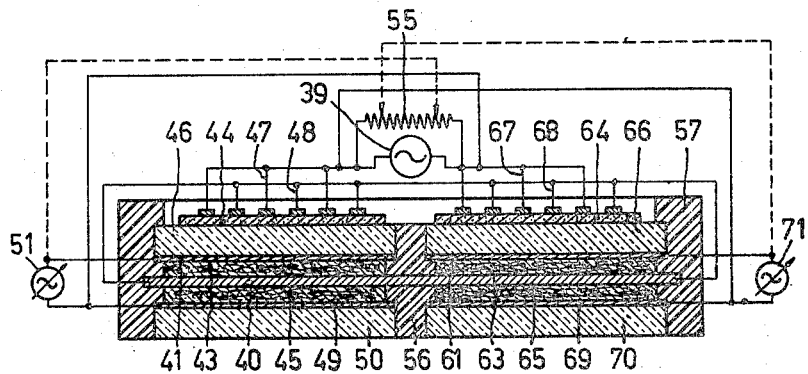
FIGURE 3 shows a cross sectional view of an electro-optical bistable relaxation circuit, in which two different manners are shown for obtaining adjustable optical feedback.

FIGURE 3 is a cross sectional view of a device according to the invention which forms a bistable relaxation circuit arrangement. The device comprises two sections built up in equal manner, in each of which an optical feedback coupling takes place to be controlled with external means. A non-transparent, preferably reflecting, metal electrode plate 40 is common to the two sections, one of which is shown in cross section in the left-hand half and the other in the right-hand half of the figure. In each section, this plate is a common electrode for two electro-luminescent layers 43 and 45 and 63 and 65 respectively provided on either side of the plate. The second electrode of the layers 43 and 63 is formed by a conductive layer 41 and 61 respectively on the surface of a transparent carrier 46 and 66 respectively. These carriers are provided on the other side with a photo-conductive layer 44 and 64 respectively containing interlined comb-shaped electrodes 47 and 48, and 67 and 68 respectively. The second electrode of the electro-luminescent layer 45 and 65 respectively is formed by a laminar transparent electrode 49 and 69 respectively preferably on a transparent carrier 50 and 70 respectively. The device described is supplied by a main voltage source 39, one terminal of which is connected to the comb-shaped electrode 47 in the left-hand section and to the laminar electrode 69 in the right-hand section, while the other terminal is connected to the comb-shaped electrode 67 in the right-hand section and to the laminar electrode 49 in the left-hand section. The comb-shaped electrodes 48 and 68 respectively of the photo-conductive layers 44 and 64 respectively is connected to the common electrode plate 40.

In each of the sections, the upper photo-conductive layer 44 and 64 respectively may be influenced by the light which is emitted by the electro-luminescent layer 43 and 63 respectively situated below said layer. As a result of this, optical feedback analogous to the feedback between the electro-luminescent cell 3 and the photo-conductive cell 2 in the device shown in FIGURE 1 is obtained in each of the sections. The ratio of the feedback coupling is controllable in each section because between the electrodes 41 and 45 in the left-hand section an adjustable auxiliary voltage source 51 and between the electrodes 61 and 65 in the right-hand section a similar auxiliary voltage source 71 is connected. The auxiliary voltage sources 51 and 71 supply an alternating voltage which preferably has the same frequency as the voltage supplied by the main source 39. By adjustment of the amplitude and the phase of the alternating voltage of the source 51, it may be obtained that the voltage across the electro-luminescent layer 53 is in a defined manner lower, possibly higher, than that across the layer 45, so that by controlling the voltage of the source 51 the degree of optical feedback coupling may be adjusted at will. The same holds for the voltage of the source 71, with which the degree of optical feedback between the electro-luminescent layer 63 and the photo-conductive layer 64 may be controlled. The object of the optical feedback is that each section as two stable states, in one of which the photo-conductive layer 44 and 64 respectively has a high resistance and consequently the electro-luminescent layers below said layers do not emit light, while in the other the electroluminescent layers do emit light and the resistance of the photo-conductive layer situated above is low. Because the electrode 40 is common for both sections the device exhibits two stable states, in each of which the sections occupy opposite stable states, that is that either the one or the other of the two electro-luminescent layers 45 and 65 luminesces, while the remaining one does not emit light. Switching over the device from one stable state into the other can be obtained by irradiating the photoconductive layer above the non-luminescing electro-luminescent layer, so that the resistance thereof is decreased sufficiently. This latter depends on the extent of optical feedback between the photo-conductive layer 44 and 64 respectively and the electro-luminescent layer 43 and 63 respectively situated below said layer and emitting light to this layer. As described above, this degree of feedback is determined by the amplitude and the phase of the voltage supplied by the sources 51 and 71. In case of a high degree of feedback a comparatively strong irradiation or light impulse is required on the photo-conductive element 44 or 64 which has a high resistance at that instant for changing over from one into the other stable state of the device. This control irradiation or control pulse respectively may be less intense or smaller respectively, according as the voltage of the sources 51 and 71 is adjusted so that a lower voltage appears across the associated electro-luminescent layer 43 and 63 respectively. Also, the smaller difference in resistance of the photo-conductive elements in the one and in the other stable state of a section as a result of lowering the voltage across the layers 43 and 46 will have the effect that the transition from one state into the other state in response to a given control irradiation intensity or control impulse can occur more rapidly. Because the electro-luminescent elements 43 and 63 which affect the optical feedback in a section are different from the electro-luminescent layers 45 and 65 respectively which supply an output signal of the device, the amplitude of the voltage source 39 may independently of the desired degree or feedback be chosen such that in a stable state the maximally permissible voltage is set up across the electro-luminescent layer (45 or 65) supplying the output signal, so that the signal output of the device is optimal. The output signals of the device are of an optical nature and may for example be used for controlling a further similar device, the photo-conductive layers corresponding to the layers 64 and 44 of which are arranged opposite to the electro-luminescent layers 45 and 65. The input signal, that is to say the external irradiation of the photo-conductive layers 44 and 64, may be obtained by means of a similar preceding device. Naturally, it is possible to control the device in a different manner, for example by providing an electro-luminescent cell or other radiating element above each of the photo-conductive layers 44 and 64, to which cells or radiation elements electrically controllable pulses are supplied.

Instead of using separate controllable voltage sources 51 and 71, controllable impedances, for example adjustable resistors, may be substituted, each of which performs a function in the associated section of the device equal to that of the adjustable impedance 4 in the device shown in FIGURE 1.

In FIGURE 3 another possibility is indicated by dotted lines. Instead of utilizing separate voltage sources 51 and 71, the voltage at the electro-luminescent layers 43 and 63 may be adjusted by including so to say in the branch comprising such a layer an adjustable part of the main supply source 39. This is shown in FIGURE 3 by connection of the electrode 41 and 61 respectively each to an adjustable contact of an impedance 55, for example a resistor or inductance, shunting the supply source 39. It is easy to see that the degree of positive feedback is decreased by shifting such a contact farther away from that end of the impedance 55 which is connected to the same terminal of the source 39 to which the electro-luminescent layer 45 and 65 respectively situated below the feedback layer 43 and 63 respectively is connected.

In order to restrict the feedback action in the two sections of the device shown in FIGURE 3 to the section in question and also to keep the optical output signals produced by the electro-luminescent layers 45 and 65 separated, a non-transparent wall 56 is provided above and below the common electrode 40 and between the two sections. In addition, the device is surrounded on the sides by a non-transparent insulating jacket 57. The partitions 56 and the jacket 57 may consist, for example, of a non-transparent hardened synthetic material, for example an epoxy casting resin.

Figures 4, 5:
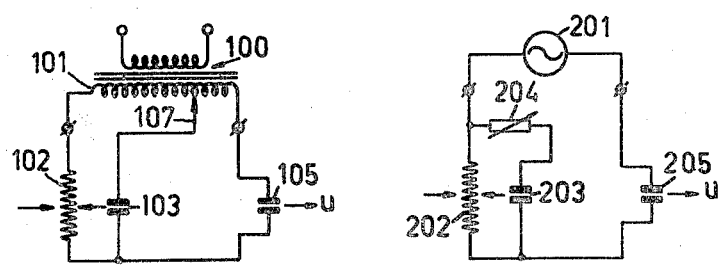
FIGURE 4 shows the circuit arrangement of a device, in which control of the optical feedback is obtained by means of an adjustable voltage tap.
FIGURE 5 is the circuit diagram of a device which differs from that of FIGURE 1 in the manner in which the branch with the feedback radiation element is connected to the main supply source.

FIGURE 4 shows the circuit diagram of a device, in which, as in the device shown in FIGURE 3, an independently controllable part of the main supply voltage affects the voltage across an electro-luminescent cell coupled optically to a photo-conductive cell. The supply voltage is derived from the terminals of the secondary 101 of a transformer 100 and impressed upon a series arrangement of a photo-conductive element 102 and an electro-luminescent cell 105 which supplies the output signal U. To the junction of the photo-conductive element 102 and the output cell 105, an electro-luminescent cell 103 coupled optically to the element 102 is connected, the other electrode of which is connected to an adjustable sliding contact 107 on the secondary 101 of the transformer 100. Shifting this contact changes the degree of feedback coupling. The at first positive feedback coupling becomes smaller according as the contact 107 is farther remote from that end of the winding 101 which is connected to the cell 105.

It is noted that the feedback coupling is termed positive and negative respectively when the change, which an external signal would cause in the state of the device in case no optical feedback coupling were present, is amplified and decreased respectively by the presence of such a feedback coupling. If in the device according to the circuit diagram shown in FIGURE 4 the contact 107 is shifted far to the left, that is to say to that end of the cell 101 to which the photo-conductive cell 102 is connected, this cell and the electro-luminescent cell 103 are substantially parallel electrically with reference to the transformer 100. A decrease of the voltage across the cell 102 as a result of a decrease of the resistance thereof by means of an external light signal also causes the voltage across the cell 103 to decrease, as a result of which this latter irradiates the photo-conductive cell 102 less strongly and consequently the resistance change of the cell 102 is counteracted. So in that case, one has to do with a negative feedback coupling. This has a linearizing effect on the characteristic which indicates the relation between the external illumination of the photo-conductive cell 102 and the luminance of the output cell 105. In order to obtain, without external light signal on the cell 102, the desired voltage distribution between the cells 103 and 105, it is of advantage to choose the capacity of the cell 103 smaller, for example a factor 2 smaller, than that of the electro-luminescent cell 105.

The device according to the circuit diagram shown in FIGURE 5 very much resembles the device according to the circuit diagram shown in FIGURE 4, when in this latter the contact 107 is shifted to the left. The alternating voltage source 201 supplies a series arrangement of a photo-conductive cell 202 and an electro-luminescent cell 205 which supplies the output signal U. Connected in parallel to the cell 202 is a series arrangement of an electro-luminescent cell 203 coupled optically therewith and a controllably adjustable impedance 204, for example consisting of an adjustable resistor. Changing the adjustment of the impedance 204, in which the impedance value thereof increases, causes the degree of feedback coupling, which in this case is negative, to decrease and conversely.

While in the examples given above the voltage at the cell supplying the output signal increases when the resistance of the photo-conductive cell decreases, the voltage variation at the two said cells varies in the device shown in the circuit diagram of FIGURE 6 is the same. This is obtained by parallel combination of the said cells. The device according to the circuit diagram of FIGURE 6 has three branches connected in parallel electrically: a first branch with a photo-conductive cell 302, a second with an electro-luminescent cell 303 optically coupled with the cell 302 and electrically in series therewith an adjustable impedance 304, while the third branch comprises an electro-luminescent cell 305 which supplies the output signal U. The parallel combination of these three branches is connected in series with a series impedance 308 to an alternating voltage source 301. The series impedance 308 ensures that upon a change in the resistance of the photo-conductive cell 302, the part of the supply voltage supplied by the source 301, which appears across the parallel combination of the said three branches and consequently across the output cell 303, varies in the same direction. An optical input signal on the photo-conductive cell 302, with which the resistance thereof is decreased, consequently results in a decrease of the luminance of the output cell 305. So one has to do here with signal inversion. By changing the adjusted value of the impedance 304, the degree of feedback coupling, which in this case is negative again, can be varied.

In the device shown in the circuit diagram of FIGURE 7, a photo-conductive cell 402 and an electro-luminescent output cell 405 are connected in parallel electrically, as was the case also in the diagram shown in FIGURE 6, and a series impedance 408 is included in series with these two branches. So in this device again signal inversion occurs. The optical feedback coupling which is obtained via the electro-luminescent cell 403 connected to the junction of the cells 402 and 405 and the impedance 408, this time is a positive one, however, because the adjustable impedance 404 which is connected in series with the cell 403 is connected to a terminal of the voltage source 401 which is different from the one to which the parallel combination of the two branches comprising the cells 402 and 405 is directly connected.

In the above discussion of the circuit diagrams of the FIGURES 1, 4, 5, 6 and 7 electro-luminescent cells have continually been mentioned. It will be clear that instead of those mentioned other radiation elements thereof the intensity of the radiation emitted is dependent on the electrical energy supplied to such an element may be used, for example incandescent lamps, gas discharges and field quenching cells. With cells exhibiting field quenching, increasing voltage at the element results in decrease of the luminance, so that, if such a cell is used for optical feedback and the output signal respectively, this coupling and the output signal respectively becomes inverted. Alternatively, the cell optically feeding back to a photo-conductive cell may be of a different type from the cell which supplies the output signal. The two radiation elements may also be of the same type, for example both electro-luminescent, but having a different colour of the light emitted. In connection with the sensitivity it is of advantage to adapt the spectral emission curve of the light emitted by the feedback cell to the spectral sensitivity curve of the photo-conductive element optically coupled therewith. In order to obtain a rapid response of a photo-conductive cell to the radiation of the radiation element coupled optically herewith, it is of advantage, by choice of the radiation element and/or the medium between the two, to ensure that the feedback radiation has a small depth of penetration in the photo-conductive material, for example smaller than 5 microns, so, when using cadmium sulphide cells, in combination with the blue part of the visible spectrum.

The adjustable feedback coupling according to the invention may advantageously be used in a solid state image amplifier. An example thereof is illustrated in FIGURES 8 and 9 which each show a part of a cross section. These cross sectional views are at right angles to each other, FIGURE 8 shows a cross section taken along the line VIII—VIII in FIGURE 9 while FIGURE 9 shows a cross section taken along the line IX—IX in FIGURE 8.

A flat or slightly bent carrier 500 consisting of a glass plate is at its upper side provided with a number of parallel extending mutually separated electrode lines (511 and 512) which are alternatively connected together, so that the various electrodes 511 and also the various electrodes 512 form a group which has the same electrical potential. The electrodes 511 and 512 consist in known manner of transparent conductive tin oxide on the surface of the carrier 500. On the electrodes 511, electro-luminescent strips 503 following these electrodes are provided consisting of a red electro-luminescing substance and sintered glass powder. The electro-luminescent substance may consist, for example, of ZnSe activated with Cu and Al. On the electrodes 512 also electro-luminescent strips 505 are provided consisting of an electro-luminescent substance and a sintered glass powder. The electro-luminescent substance in these strips consists, for example, of zinc-sulphide activated with copper and aluminum. The strips 505 are on the upper side covered with a thin layer 513 consisting of white reflecting material, for example titanium oxide in glass powder. On this layer a non-transparent metal layer 514 extends. The space between the strips 503 and 505 is filled with insulating material 515 which preferably is non-transparent and consists, for example, of sintered black glass.

On the layer formed by the strips 503 and 505 and the insulating material 515 provided between them, a plurality of parts 516 of an originally uninterrupted current diffusing layer are provided two of which each time bridge an adjacent pair of strips 503 and 505. The parts 516 consist of conductive cadmium sulphide (for example cadmium sulphide activated with chlorine only) in glass powder, which layer is sintered. The layer contains approximately 30% by volume of glass and approximately 70% by volume of conductive cadmimum sulphide. On the parts 516 of the conductive layer just mentioned small truncated pyramids 517 are provided consisting of glass with aluminum oxide as filler. The laminar parts 516 and the pyramids 517 are obtained by first providing a layer of conductive cadmium sulphide, glass powder and a binding agent of a thickness of approximately 50 microns on the layer consisting of the strips 503 and 505 with the intermediate insulating parts 515 and providing on this layer a layer which consists of glass powder with aluminum oxide and a binding agent. Then, parallel and equidistant grooves 518 are provided in both layers, which grooves extend in the direction of the electrodes 511 and 512. These grooves are V-shaped, the walls enclosing an angle of approximately 60°. The depth of these grooves is such that they substantially reach the layer with the electro-luminescent strips 503 and 505. The bottom of these grooves is situated at the insulation 515 between a luminescent strip 503 and a luminescent strip 505, while in addition the mutual distance of these grooves is such that between successive grooves each time a strip 503 and a strip 505 is available.

A second set of parallel and equidistant grooves 519 (FIGURE 9) is now provided in the direction at right angles to that of the grooves 518. These likewise V-shaped grooves are provided with a depth such that they intersect on the bottom the conductive strips 514 originally extending throughout the length of the strips 505. As a result of this and owing to the intersection of the grooves 518 in the originally closed layer 516, the strips 503 and 505 are divided each time into one pair of associated elements which are situated below a pyramid 517 and which have at their upper side a common electrode in the form of a laminar element 516 of the originally uninterrupted current diffusing layer previously arranged over strips 503 and 505 and the intermediate insulation 515. By sintering the assembly, the pyramids 517 may be solidified and bounded to the layers situated therebelow.

The walls of the grooves 518 and 519 are covered with an uninterrupted layer 502 consisting of photo-conductive material. The layer 502 may consist, for example, of photoconductive cadmium sulphide and a binding agent or of vapour-deposited photo-conductive cadmium sulphide. Each current diffusing part 516 forms a more or less conductive connection between the layer 502 on the bottom of a groove 518 and 519 and the elements of the strips 503 and 505 covered by this part. The photo-conductive layer 502 is on the top of the pyramids 517 in contact with an electrode which is formed by a conductive layer consisting of tin oxide 520 at the lower side of a thin flexible glass foil 521, which foil is provided across the tops of the layer 502 and is kept pressed to it. Instead of a glass foil with a conductive surface layer, a metal wire grid may be used as current supply electrode for the tops of the photo-conductive layer 502.

The electrode 520 is connected to the one terminal of an alternating voltage source 501, the other terminal of which is conductively directly connected to the interconnected electrode lines 512 on the carrier 500. The interconnected electrodes 511 are connected to the same terminal of the source 501 to which the electrodes 512 are connected, however, with the interposition of an adjustable auxiliary voltage source 504.

The solid state image amplifier described in fact consists of an assembly of identical groups of elements, each group comprising a photo-conductive element and two electro-luminescent elements which are connected in accordance with the circuit diagram shown in FIGURE 4, in that sense that the adjustable impedance 4 of this circuit diagram is replaced by the auxiliary voltage source 504 which is common for all the identical groups of elements. The photo-conductive element 2 of FIGURE 1 is formed, in such a group of elements of the solid state image amplifier shown in FIGURES 8 and 9, by that part of the photo-conductive layer 502 which extends over the sides and the top of a pyramid 517. The electro-luminescent cell 3 of FIGURE 1 providing optical feedback corresponds to that part of the strip 503 which is below the laminar part 516 which engages the relative pyramid. The output cell 5 of the circuit diagram of FIGURE 1 corresponds to a part of the electro-luminescent strip 505 below the relative pyramid 517. Only the elements of the strips 503 are coupled optically to the part of the photo-conductive layer 502 situated above, the elements of the strips 505 are screened optically in the direction of the parts of the photo-conductive layer 502 situated above by the reflecting strips 513 and the striplike metal layers 514. The degree of feedback between the elements of the strips 503 and the electrically associated parts of the photoconductive layer 502 can be adjusted in common for all the groups of elements by choice of the voltage of the source 504. By increasing the degree of feedback, that is to say increase of the voltage supplied by the source 504, provided it is in phase or approximately in phase with the voltage of the main voltage source 501, it may be achieved that the amplification increases and finally instability occurs which may be used for retaining an image corresponding to a picture projected on the photo-conductive layer 502 for a longer or shorter period.

The output image supplied by the picture amplifier is formed by the light emitted both by the elements of the electro-luminescent strips 505 and those of the strips 503. In the case described, this light is of a different colour for the various strips. When changing the value of the voltage supplied by the source 504, as a rule a change in the ratio of the luminance of elements of the strips 503 and 505 controlled by the same part of the photo-conductive layer 502 will occur, as a result of which colour variations of the output light may become noticeable. This latter may be prevented by providing below the electrode lines 511 a non-transparent layer, for example consisting of black glass, so that only the elements of the strips 505 make the amplified image visible. Naturally, the same electro-luminescent strips 505 and 503 subject to the photo-conductive layer 502 being sensitive to the luminescent light of this material. When using different electro-luminescent materials for the feedback elements and the output elements, a simplification of the screening measures can be obtained by constructing the electro-luminescent strips 503 and 505 identically, namely by having each of them consist of two superimposed layers separated by a thin non-transparent layer, for example a layer of black glass enamel, of which superimposed layers the one on the side of the pyramids 517 is suitable for the optical feedback and that on the side of the carrier plate 500 supplies the output light. It is even simpler to fill also the spaces 515 between the strips 505 and 503 in this manner, so that across the whole glass plate 500 with the electrodes 511 and 512 an electro-luminescent layer extends consisting of two superimposed parts with different electro-luminescent materials screened optically from one another, in which the upper part may consist, for example, of red luminescent material and the lower part of yellowish-green luminescent material.

Instead of an auxiliary voltage source 504, a potentiometer shunting the voltage source 501 may be used, of which the movable contact is connected to the electrodes 511 of all feedback electro-luminescent elements 503. Replacement of the auxiliary voltage source 504 by an adjustable impedance which is thus common for all the elements 503 is also possible but less favourable because in this case the energy absorption of the one element influences that of another element.

What is claimed is:

1. An electro-optical device comprising a first radiation-responsive variable-impedance element for receiving input radiation, a first voltage-responsive radiation element optically coupled to the first variable-impedance element and providing optical feedback, a second voltage-responsive radiation element optically shielded from the first variable-impedance element for producing output radiation, a main source of potential, means connecting the main potential source to the first variable-impedance element and the first and second radiation elements in a star-connected circuit at which the said elements are connected to a common potential point and at which the impedance condition of the first variable-impedance element controls the voltage across the second radiation element and thus the radiation emission therefrom, means for irradiating with input radiation the first variable-impedance element to change its impedance condition, means for utilizing the emission level of output radiation from the second radiation element, and means in series with the first radiation element for controlling the voltage across the first radiation element independent of that applied across the star-connected circuit from the main potential source, a variation in said controlling means causing a change in the emission level of radiation from the first radiation element impinging on the first variable-impedance element and thus the degree of optical feedback employed in the device.

2. A device as set forth in claim 1 wherein the controlling means comprises an adjustable impedance in series with the first radiation element.

3. A device as set forth in claim 1 wherein the controlling means includes an auxiliary voltage source.

4. A device as set forth in claim 1 wherein the first and second radiation elements are connected in parallel.

5. A device as set forth in claim 4 wherein the variable-impedance element is connected in series with the parallel-connected radiation elements.

6. A device as set forth in claim 1 wherein a potentiometer shunts the main potential source, and the first radiation element is coupled to the movable contact of the potentiometer as the controlling means.

7. An electro-optical device comprising a first radiation-responsive variable-impedance element for receiving input radiation, a first voltage-responsive radiation element optically coupled to the first variable-impedance element and providing optical feedback, a second voltage-responsive radiation element optically shielded from the first variable-impedance element for producing output radiation, a main source of potential, means connecting the main potential source to the first variable-impedance element and the first and second radiation elements in a star-connected circuit at which the said elements are connected to a common potential point and at which the impedance condition of the first variable-impedance element controls the voltage across the second radiation element and thus the radiation emission therefrom, means for irradiating with input radiation the first variable-impedance element to change its impedance condition, means for utilizing the emission level of output radiation from the second radiation element, an adjustable impedance comprising a second radiation-responsive, variable-impedance element connected in series with the first radiation element, and controllable radiation means for controllably irradiating the second variable-impedance element to control its impedance condition for controlling the voltage across the first radiation element independent of that applied across the star-connected circuit from the main potential source, a variation in said controllable means causing a change in the emission level of radiation from the first radiation element impinging on the first variable-impedance element and thus the degree of optical feedback employed in the device.

8. A device as set forth in claim 7 wherein the radiation elements and the radiation means are electroluminescent layers.

9. A solid-state image amplifier comprising plural electro-optical devices comprising a first radiation-responsive variable-impedance element for receiving input radiation, a first voltage-responsive radiation element optically coupled to the first variable-impedance element and providing optical feedback, and a second voltage-responsive radiation element optically shielded from the first variable-impedance element for producing output radiation; a main source of potential; means connecting the main potential source to the first variable-impedance element and the first and second radiation elements, which are connected in common, in a star-connected circuit at which the said elements are connected to a common potential point and at which the impedance condition of the first variable-impedance elements controls the voltage across the associated second radiation elements and thus the radiation emission therefrom; means for irradiating with input radiation the first variable-impedance elements; the emission level of output radiation from the second radiation elements being visible and observable; and common means in series with all the first radiation elements for controlling the voltage across all the first radiation elements independent of that applied across the star-connected circuit from the main potential source, a variation in said controlling means causing a change in the emission level of radiation from the first radiation elements impinging on the associated first variable-impedance elements and thus the degree of optical feedback employed in the device.

10. An amplifier as set forth in claim 9 wherein the common controlling means includes an adjustable auxiliary voltage source.

11. An amplifier as set forth in claim 9 wherein the common controlling means includes an adjustable impedance in series with all the first radiation elements.

12. An amplifier as set forth in claim 9 wherein the common controlling means includes a variable-tapped potential source for varying the voltage across the first radiation elements.

13. An amplifier as set forth in claim 9 wherein the first radiation elements constitute a first strip of electroluminescent material, the second radiation elements constitute a second parallel strip of electroluminescent material, the variable-impedance elements associated with the first strip being optically coupled thereto, the same variable-impedance elements associated with the second strip being optically shielded therefrom.

14. An amplifier as set forth in claim 13 wherein the said variable-impedance elements associated with the first and second strips are united to form a superposed photoconductive layer overlying both strips.

15. An amplifier as set forth in claim 9 wherein the first radiation elements are united to form a first layer adjacent the variable-impedance elements, the second radiation elements are united to form a second layer remote from the variable-impedance elements, and optical shielding means are provided between the two layers, whereby the variable-impedance elements are optically coupled only to the first layer but not the second layer, whose radiation constitutes the output of the amplifier.

References Cited by the Examiner

UNITED STATES PATENTS

| | | | |
|---|---|---|---|
| 2,907,001 | 9/59 | Loebner | 250—213 |
| 2,908,824 | 10/59 | Nicoll | 250—213 |
| 2,957,991 | 10/60 | Kazan | 250—213 |
| 3,031,579 | 4/62 | Hook et al. | 250—213 |
| 3,042,807 | 7/62 | Vize | 250—213 |
| 3,045,117 | 7/62 | Beatty | 250—213 X |
| 3,087,068 | 4/63 | Bowerman | 250—213 |
| 3,112,403 | 11/63 | Blank | 250—213 |

RALPH G. NILSON, *Primary Examiner.*

WALTER STOLWEIN, *Examiner.*